United States Patent [19]
Funk et al.

[11] Patent Number: 5,153,398
[45] Date of Patent: Oct. 6, 1992

[54] METAL-CLAD, COMPRESSED-GAS INSULATED, HIGH-VOLTAGE SWITCHING STATION WITH AN INSULATED GROUNDING SWITCH

[75] Inventors: Karl-Heinz Funk; Jurgen Haarhuis; Dieter Lorenz, all of Berlin, Fed. Rep. of Germany

[73] Assignee: Siemens Aktiengesellschaft, Berlin & Munich, Fed. Rep. of Germany

[21] Appl. No.: 635,613

[22] PCT Filed: Nov. 3, 1988

[86] PCT No.: PCT/DE88/00686
§ 371 Date: Jan. 9, 1991
§ 102(e) Date: Jan. 9, 1991

[87] PCT Pub. No.: WO90/01787
PCT Pub. Date: Feb. 22, 1990

[30] Foreign Application Priority Data

Aug. 4, 1988 [DE] Fed. Rep. of Germany ....... 3826762

[51] Int. Cl.⁵ .............................. H01H 33/54
[52] U.S. Cl. .................... 200/148 R; 200/148 B
[58] Field of Search .......... 200/148 R, 148 A, 148 B, 200/148 D, 148 F

[56] References Cited

U.S. PATENT DOCUMENTS

| | | | |
|---|---|---|---|
| 3,778,574 | 12/1973 | Clark | 200/148 R |
| 3,876,846 | 4/1975 | Graybill | 200/148 B |
| 3,987,260 | 10/1976 | Wilson | 200/148 B |
| 4,486,634 | 12/1984 | Nakano et al. | 200/148 R |

Primary Examiner—J. R. Scott
Attorney, Agent, or Firm—Kenyon & Kenyon

[57] ABSTRACT

A metal-clad, compressed-gas insulated, high-voltage switching station with an insulated grounding switch. In the case of compressed-gas insulated, high-voltage switching stations, insulated grounding switches are also used for applying test voltages. Therefore, provided between the housing and the casing is an insulating ring, within which a conductor is embedded with a terminal lug which contacts the contact pin. In order to improve the insulation, the insulating ring reposes within a metallic ring, which acts as a prop ring and which receives the fixing agents. It is only interrupted by the terminal lug which is provided with an insulating enclosure. The insulating ring is thus largely relieved from mechanical stresses. Insulated grounding switches are used in the case of metal-clad, high-voltage switching stations which are insulated by $SF_6$ compressed gas.

2 Claims, 1 Drawing Sheet

METAL-CLAD, COMPRESSED-GAS INSULATED, HIGH-VOLTAGE SWITCHING STATION WITH AN INSULATED GROUNDING SWITCH

BACKGROUND OF THE INVENTION

The invention relates to a metal-clad, compressed-gas insulated, high-voltage switching station with an insulated grounding switch whose housing is flange-mounted to the casing of the high-voltage switching station by way of flanges and fixing agents which connect these flanges, whereby one insulating ring is mounted gastight between both flanges. On the inside of this insulating ring, an annular electric conductor, which is provided with a terminal lug, is embedded such that the terminal lug which runs outside passes radially through the insulating ring, and the annular part of the conductor surrounds the contact pin of the grounding switch with clearance, whereby the conductor bears a sliding contact by way of which it is electrically connected to the contact pin.

This type of an insulated grounding switch for a metal-clad, compressed-gas insulated, high-voltage switching station is known from the teachings of U.S. Pat. No. 3,778,374. The conductor, with the terminal lug running to the outside, which is embedded in the insulating ring can be either grounded via this grounding switch or a voltage can be applied to it which is then transferred to the contact pin of the grounding switch in order to implement testing. In the known grounding switch, the annular part of the conductor is embedded on the inside of the insulating ring. This insulating ring reposes between the flange of the housing of the grounding switch and the flange of the casing of the high voltage switching station and is penetrated by the fixing agents which serve to fasten the grounding switch to the high voltage switching station. In this manner, the insulating ring is pressurized by the compression forces required for fastening it and is thereby mechanically stressed by high compressive forces.

Consequently, the tightening torques for the fixing agents must be stipulated precisely and with a narrow tolerance range in order to avoid overloading the insulating material. Furthermore, the fixing agents must be provided with an insulation since they are located in the immediate vicinity of the embedded conductor and are connected to the grounded casing. The entire outer surface area of the insulating ring is furthermore exposed. In the case of outdoor use, this can create problems since then the insulating property of the insulating ring can be impaired by deposits.

SUMMARY OF THE INVENTION

The invention is based on the task of improving the insulation of the grounding switch in the case of a metal-clad, compressed-gas insulated, high-voltage switching station of the initially described type.

In order to solve this task in the case of a metal-clad, compressed-gas insulated, high-voltage switching station with an insulated grounding switch according to the invention, the insulating ring reposes within a metallic ring of at least the same height and with this metallic ring is mounted gastight between both flanges. The metallic ring has a radially directed opening through which the terminal lug, which is provided with an insulating enclosure, extends, and the fixing agents penetrate only the outer metallic ring.

For the insulating ring, the outer metallic ring acts as a prop ring, which encloses the insulating ring on the entire outer surface area. Only at one spot on the periphery does it have an opening, which, however, does not extend through its entire height and which is penetrated but not interrupted by the insulated and gastightly projecting terminal lug. Thus, there is always a metallic connection between the housing of the grounding switch and the casing regardless of whether the grounding switch is being used for grounding or for test purposes. The fixing agents are only run through metallic parts and do not require a separate insulation. Moreover, in this manner, a precise insulating clearance is guaranteed between the mounting flanges as well as a defined packed sealing gap between the flange and the ring, respectively.

The forces required for fastening are absorbed only by the metal parts. The insulating ring is only stressed by the compressive forces of the sealing ring and therefore is subjected to only low mechanical stresses. Furthermore, since only the thin-walled insulating enclosure which surrounds the terminal lug leads outside, this design is also well suited for high-voltage switching stations which are located outdoors.

It is particularly advantageous when the insulating ring consists of cured cast resin. In this case, the outer metallic ring can be used as part of the requisite casting mold, within which the electric conductor along with the terminal lug are inserted and retained with the appropriate clearance. The embedding of the conductor thus takes place during casting, and the molding compound then forms the insulating ring and the insulating enclosure of the terminal lug after curing. During curing, furthermore, there is the advantage that the cast resin shrinks onto the terminal lug and thus forms a gastight connection there. Therefore, no special additional measures are required in order to produce the gastightness between the terminal lug and the insulating ring. The gastight sealing of the end faces of the insulating ring to the adjacent end faces of the flanges takes place in the usual manner with the aid of sealing rings.

BRIEF DESCRIPTION OF THE DRAWINGS

The invention is more closely explained in the following in light of the exemplified embodiment which is represented in FIGS. 1 and 2 of the drawing, however, to which exemplified embodiment the invention is not restricted. In a schematic representation.

DETAILED DESCRIPTION

Figure 1:
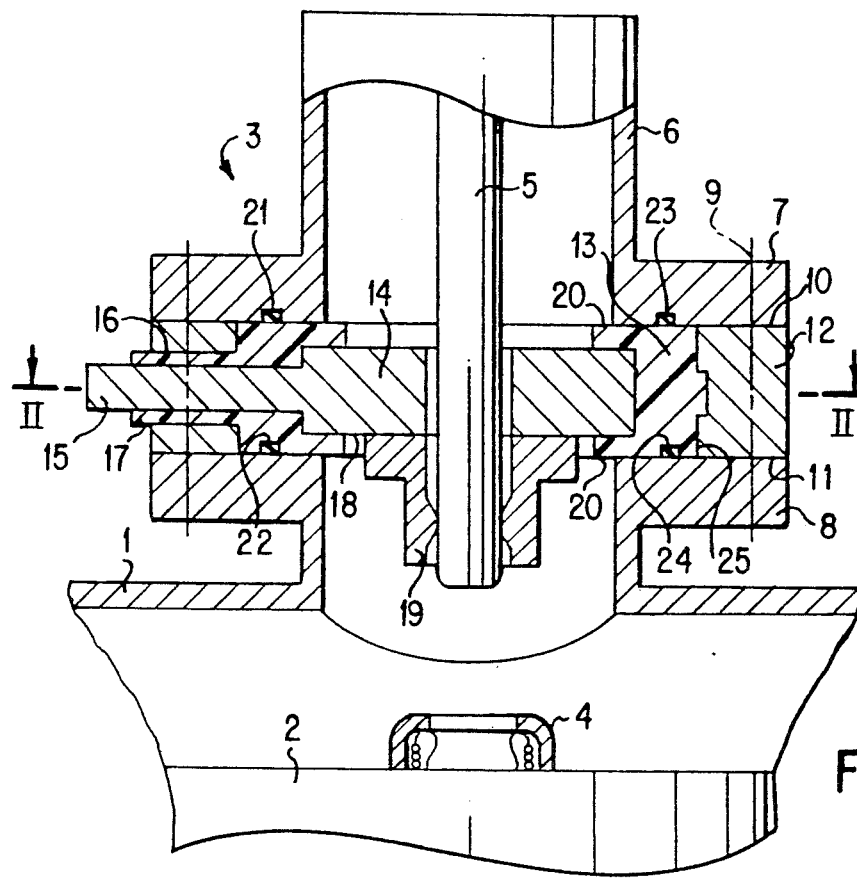
FIG. 1 shows the part of a longitudinal section through a metal-clad, compressed-gas insulated, high-voltage switching station with an insulated grounding switch.
Figure 2:
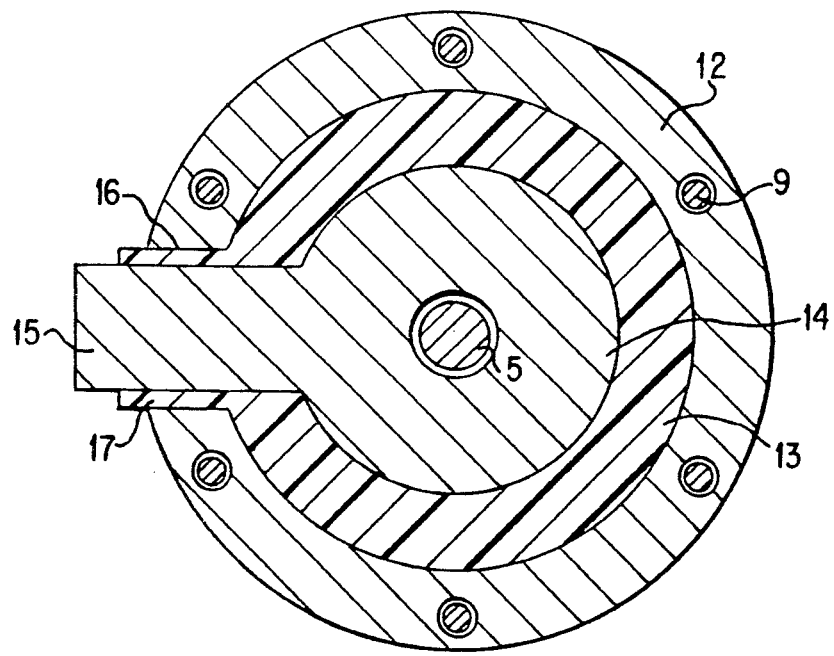
In FIG. 2, the section II—II in FIG. 1 is represented.

In the case of a metal-clad, high-voltage switching station which is insulated with compressed gas, in particular with $SF_6$, a conductor 2 carrying high voltage, which can be grounded by means of a grounding switch 3, is mounted within a casing 1. For this purpose, the conductor 2 has the counter contact 4 for the contact pin 5 of the grounding switch 3, which contact pin 5 is moved by a driving mechanism not shown and which can be engaged with the counter contact 4.

The housing 6 of the grounding switch 3 ends in a flange 7 which corresponds with its dimensions to a flange 8 of the casing 1. In order to connect both flanges 7,8, only indicated fixing agents 9 are used, e.g. bolts or screws which are screwed into corresponding threaded holes in the flange 8. So that the grounding switch 3 can be utilized not only for grounding purposes but also for testing purposes, the end faces 10 of the flange 7 which are turned towards each other and the end faces 11 of the flange 8 do not repose immediately adjacent each other, but rather, a metallic ring 12 is mounted between them which is penetrated by the fixing agents 9. The ring does not have the same width as the flanges 7 and 8 but rather is narrower.

An insulating ring 13, on the inside of which an annular electric conductor 14 is embedded, reposes within the metallic ring 12. This conductor 14 has a terminal lug 15 which extends out in radial direction and which penetrates the insulating ring 13 as well as the metallic ring 12, whereby the opening 16 in the metallic ring 12 has a larger cross section than the terminal lug 15 and the thus created gap is filled up by a correspondingly thin-walled insulating enclosure 17. The thickness of this insulating enclosure 17 is dimensioned according to the magnitude of the test voltage to be applied. The conductor 14 bears on its end face 18 which is turned towards the casing 1 the sliding contact 19, which contacts the contact pin 5 of the grounding switch 3. In this manner, voltaic contact between the contact pin 5 and the conductor 14 or its terminal lug 15 is provided so that either the test voltage or ground potential can be transferred from the terminal lug 15 to the contact pin 5.

The insulating ring 13 consists of cured casting resin, e.g. epoxy resin. It is prepared in that the metallic ring 12 which acts as a prop ring is part of a casting mold within which the conductor 14 with its terminal lug 15 is retained correspondingly at a distance from the walls of the casting mold or the opening 16. The conductor 14 is embedded in the insulating ring 13 by means of the casting process and subsequent curing of the casting resin. The insulating enclosure 17 thereby shrinks gastight onto the terminal lug 15. While assembling the insulating ring 13 with the conductor 14, only a gastight sealing of the end faces 20 of the insulating ring 13 opposite the end face 10 of the flange 7 or the end face 11 of the flange 8 remains to be taken care of so that the SF$_6$ cannot overflow into the surrounding outside area from inside the casing 1 and the grounding switch 3. For this purpose, two sealing rings 21, 22—in particular O-rings—are provided. Of these two sealing rings, the sealing ring 21 is mounted in a groove 23 in the flange 7 while the sealing ring 22 reposes in a groove 24 in the insulating ring 13.

The insulating ring 13 is fully relieved by the metallic ring 12 of the same height from the mechanical forces presented by the fixing agents 9 for fastening the housing 6 of the grounding switch 3 to the casing 1. The insulating ring 13 virtually floats between the two sealing rings 21,22 within the metallic ring 12 which acts as a prop ring. Moreover, the outer surface area 25 of the insulating ring 13 is protected by the ring 12 from harmful influences from outside.

What is claimed is:

1. A metal-clad, compressed-gas insulated, high voltage switching station, having an insulated grounding switch, the grounding switch including a housing which is mounted to a casing of a part of the switching station by at least two flanges, the switching station comprising:
   an insulating ring;
   a metallic ring surrounding the insulating ring and having a height which is at least as high as the insulating ring, the metallic ring having a radially directed opening and being mounted with the insulating ring in a gastight fit between the flanges;
   an annular electric conductor disposed on an inside surface of the insulating ring, the annular electric conductor having a central opening which surrounds a contact pin of the grounding switch, the annular electric conductor including a sliding contact which electrically connects the annular electric conductor to the contract pin;
   a terminal lug having an insulating enclosure provided on its outer surface, the terminal lug joining the annular electric conductor and extending radially outwardly therefrom, the terminal lug extending through the insulating ring and further extending through the opening in the metallic ring; and
   fixing means for joining the flanges together, the fixing means extending through the flanges and the metallic ring.

2. The metal-clad, compressed-gas insulated, high-voltage switching station according to claim 1, wherein the insulating comprises a cured casting resin.

* * * * *